May 17, 1949.  F. E. WILSON  2,470,420
POT TYPE OIL BURNER AIR HEATING FURNACE
Filed April 17, 1946
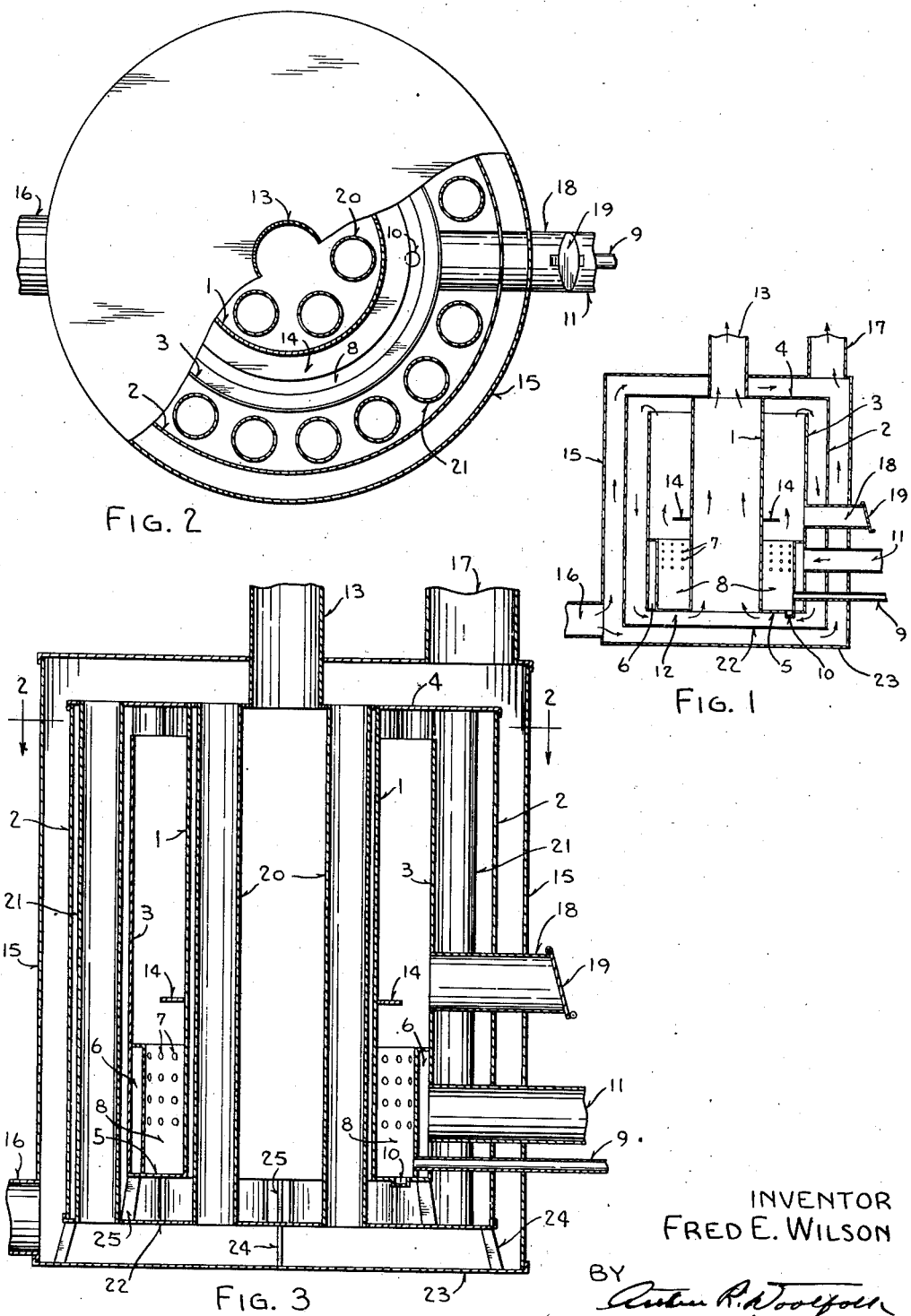
INVENTOR
FRED E. WILSON
BY
ATTORNEY Patented May 17, 1949

2,470,420

UNITED STATES PATENT OFFICE 2,470,420

POT TYPE OIL BURNER AIR HEATING FURNACE

Fred E. Wilson, Milwaukee, Wis., assignor of one-half to George O. Wray, Milwaukee, Wis.

Application April 17, 1946, Serial No. 662,763

6 Claims. (Cl. 126—116)

This invention relates to furnaces and is particularly directed to a pot-type oil furnace.

Objects of this invention are to provide a novel type of furnace in which the heated products of combustion are caused to uniformly sweep over the heat transferring sections of the furnace and to be drawn centrally from the furnace so that there is no uneven flow of the products of combustion in any portion of the furnace.

Further objects are to provide a novel arrangement of a pot-type oil furnace, in which the products of combustion are caused to heat the oil within an annularly shaped pot-like structure and to preheat the air used for combustion by heating an annularly shaped air chest, which air chest is provided with a plurality of openings above the oil level so as to admit preheated air immediately above the preheated oil to thus insure perfect combustion.

Further objects are to provide a pot-type oil furnace in which an annular combustion chamber is provided above an annular oil pot and in which baffle means are arranged to cause the products of combustion to reverse their flow and to pass downwardly around and beneath the annular oil pot and centrally upwardly through the central drum of the furnace, air flues being provided both in the central drum portion and in the portion where the products of combustion pass downwardly to thus insure an efficient transfer of heat from the furnace to the air.

Generally this invention is designed to provide a simple and novel type of furnace in which a high efficiency of heat transfer is obtained and in which the furnace may be made relatively small as compared with the present types of oil furnaces.

Embodiments of the invention are shown in the accompanying drawings, in which—

Figure 1 is a vertical sectional view through one form of furnace.

Figure 2 is a plan view of a further form of furnace, such view being partly broken away and in section along the line 2—2 of Figure 3.

Figure 3 is a vertical sectional view of the furnace shown in Figure 2.

Referring to Figure 1, it will be seen that the furnace comprises a central drum 1 and an outer drum 2 with an annular baffle 3 located between the drums. The furnace is provided with a top portion 4 and a bottom portion 5. An air chest or jacket 6 is provided and is annular and extends inside of the baffle 3. It is provided with a plurality of apertures 7 spaced upwardly above the bottom portion of the annular chamber 8, such chamber constituting the oil pot and being supplied with oil in any manner as by means of the oil pipe 9, suitable means, not shown, being provided for controlling the flow of oil in the customary manner. A small sump or depressed portion of cup shape and indicated at 10 is provided immediately adjacent and below the delivery end of the oil pipe 9 so that when the fire in the furnace is very low, oil will collect in the cup portion or depressed portion 10 and act in the manner of a pilot light to maintain a flame for subsequent operation of the furnace. The air inlet for combustion is indicated by the reference character 11 and opens into the annular air chest 6. The products of combustion pass upwardly from the oil pot 8 between the central drum 1 and the annular baffle 3 and pass downwardly in a uniform manner between the annular baffle 3 and the outer drum 2. The products of combustion pass along the lower passage 12 in a uniform manner below the oil pot 8 and preheat the oil and aid in its volatilization and also preheat the air. From this point the products of combustion pass upwardly through the central drum 1 to the smoke pipe or flue 13. Thus from the description given, it will be seen that the products of combustion flow in a uniform manner in all portions of the furnace and cause an even sweep of the products of combustion past the heat transferring members of the furnace. A small annular baffle 14 may be provided to cause turbulence in the products of combustion. The furnace proper as described hereinabove is surrounded by a housing 15 having a cold air inlet 16 and a hot air outlet 17. A peep opening 18 is provided and is equipped with a normally closed door 19. This peep opening 18 is also used in starting the furnace initially.

It will be seen that the oil burns in an annular flame around the central drum 1 and inside of the baffle 3. The air is preheated in the air chest 6 and mixes with the volatilized oil and causes perfect combustion. The products of combustion are then led downwardly as described and serve to preheat both the incoming air used for combustion and the oil in the annular oil pot.

The furnace shown in Figure 1 may be employed as it is there shown, but it has been found more efficient in operation to provide it with a plurality of air flues or air ducts as shown in Figures 2 and 3. A plurality of inner air flues or air ducts as shown in Figures 2 and 3 are provided as indicated at 20 and are located within the central drum 1 and a plurality of outer air flues or air ducts 21 are provided in the space between the annular baffle 3 and the outer drum 2. These air flues 20 and 21 are vertical pipes and open through the top 4 and the extreme bottom 22 of the furnace. The extreme bottom 22 of the furnace is supported from the bottom 23 of the outer casing 15 in any suitable manner, preferably by means of flat supporting legs 24 whose flat sides are arranged radially so as to minimize the obstruction of air flow. Also, if desired, the bottom portion 5 of the annular oil pot 8 may be supported in a like manner by flat feet 25.

In actual trials with the pot-type oil furnace constructed in accordance with the disclosure of this invention it has been found that a very high efficiency is obtained and that a uniform and even distribution of the flow of the heated products of combustion is obtained. Even with a relatively small size furnace it has been found through actual trials that a very large volume of highly heated air is obtained.

The air is not only heated by passing through the air flues or air pipes 20 and 21 but also by passing around the outer drum 2 and contacting with both the top and bottom of the furnace.

It is to be understood that if desired any suitable means could be employed for forcing air through the combustion air supply pipe 11 or, if desired, the natural draft could be depended upon. Similarly, it is to be understood that any suitable means could be employed for forcing the air to be heated into the cold air return 16. Obviously the natural circulation could be depended upon if this was desired.

It will be seen that this invention provides a novel form of pot-type oil furnace which is arranged to insure a uniform flow or sweep of the heated products of combustion throughout all portions of their travel and that a large heat transfer surface has been provided for insuring an efficient transfer of heat to the air heated by the furnace.

It will be seen further that the furnace is of relatively simple construction and may be cheaply manufactured and is highly efficient in operation.

Although this invention has been described in considerable detail, it is to be understood that such description is intended as illustrative rather than limiting, as the invention may be variously embodied and is to be interpreted as claimed.

I claim:

1. A pot-type oil furnace comprising an outer drum having a top and a bottom, an inner drum located within said outer drum and having an open bottom spaced from the bottom of the outer drum and having a top extending to the top of the outer drum, the top of the outer drum serving to close the upper end of the annular space between the inner and outer drums, an annular oil pot surrounding said inner drum adjacent the bottom thereof, an annular baffle between said drums extending upwardly from said annular oil pot and having its top edge spaced from the top of said outer drum, the bottom of said annular oil pot being arranged to close the space between the annular baffle and the inner drum, a smoke pipe leading outwardly from the upper portion of said inner drum, fuel supply means for said annular oil pot, and means for conducting air for combustion to a position immediately adjacent said annular oil pot, said annular oil pot being spaced upwardly from the bottom of said outer drum, whereby the heated products of combustion will pass around and below said annular oil pot and will preheat the oil in said annular oil pot.

2. A pot-type oil furnace comprising an outer drum having a top and a bottom, an inner drum located within said outer drum and having an open bottom spaced from the bottom of the outer drum and having a top extending to the top of the outer drum, the top of the outer drum serving to close the upper end of the annular space between the inner and outer drums, an annular oil pot surrounding said inner drum, an annular baffle between said drums extending upwardly from said annular oil pot and having its top edge spaced from the top of said outer drum, the bottom of said annular oil pot being arranged to close the space between the annular baffle and the inner drum, a smoke pipe leading outwardly from the central upper portion of said inner drum, fuel supply means for said annular oil pot, an annular air chest surrounding said oil pot and having a plurality of air discharge apertures adjacent the upper portion of said oil pot, and means for conducting air to said air chest, said annular oil pot and said annular air chest being adjacent to and spaced upwardly from the bottom of said outer drum, whereby the heated products of combustion will pass around and below both said annular air chest and said annular oil pot to thereby preheat both the air and the oil.

3. A pot-type oil furnace comprising an outer drum having a top and a bottom, an inner drum located within said outer drum and having an open bottom spaced from the bottom of the outer drum and having a top extending to the top of the outer drum, the top of the outer drum serving to close the upper end of the annular space between the inner and outer drums, an annular oil pot surrounding said inner drum, an annular baffle between said drums extending upwardly from said annular oil pot and having its top edge spaced from the top of said outer drum, the bottom of said annular oil pot being arranged to close the space between the annular baffle and the inner drum, a smoke pipe leading outwardly from the central upper portion of said inner drum, fuel supply means for said annular oil pot, an annular air chest surrounding said oil pot and having a plurality of air discharge apertures adjacent the upper portion of said oil pot, means for conducting air to said air chest, said annular oil pot and said annular air chest being adjacent to and spaced upwardly from the bottom of said outer drum, whereby the heated products of combustion will pass around and below both said annular air chest and said annular oil pot to thereby preheat both the air and the oil, and a housing surrounding said outer drum and having cold air inlet and hot air outlet means and being spaced from the top and bottom of said outer drum.

4. A pot-type oil furnace comprising a drum, an annular oil pot, means for supplying oil to said oil pot, means for supplying air for combustion to a position adjacent said oil pot, means for leading the products of combustion around said oil pot and causing the products of combustion to continuously sweep around said oil pot to preheat the oil, and a housing surrounding said drum and having cold air inlet and hot air outlet means, said oil pot having a sump arranged to retain oil and act as a pilot light means when the oil in said oil pot has been used up.

5. A pot-type oil furnace comprising an outer drum having a top and a bottom, an inner drum located within said outer drum and having an open bottom spaced from the bottom of the outer drum and having a top extending to the top of the outer drum, the top of the outer drum serving to close the upper end of the annular space between the inner and outer drums, an annular oil pot surrounding said inner drum, an annular baffle between said drums extending upwardly from said annular oil pot and having its top edge spaced from the top of said outer drum, the bottom of said annular oil pot being arranged to close the space between the annular baffle and the inner drum, a smoke pipe leading outwardly from the central upper portion of said inner drum, fuel supply means for said annular oil pot, an annular air chest surrounding said oil pot and having a plurality of air discharge apertures adjacent the upper portion of said oil pot, means for conducting air to said air chest, said annular oil pot and said annular air chest being adjacent to and spaced upwardly from the bottom of said outer drum, whereby the heated products of combustion will pass around and below both said annular air chest and said annular oil pot to thereby preheat both the air and the oil, a housing surrounding said outer drum and having cold air inlet and hot air outlet means and being spaced from the top and bottom of said outer drum, and a plurality of air flues arranged in an annular series between said annular baffle and said outer drum and opening through the top and bottom of said outer drum.

6. A pot-type furnace comprising an outer drum having a top and a bottom, an inner drum located within said outer drum and having an open bottom spaced from the bottom of the outer drum and having a top extending to the top of the outer drum, the top of the outer drum serving to close the upper end of the annular space between the inner and outer drums, an annular oil pot surrounding said inner drum, an annular baffle between said drums extending upwardly from said annular oil pot and having its top edge spaced from the top of said outer drum, the bottom of said annular oil pot being arranged to close the space between the annular baffle and the inner drum, a smoke pipe leading outwardly from the central upper portion of said inner drum, fuel supply means for said annular oil pot, an annular air chest surrounding said oil pot and having a plurality of air discharge apertures adjacent the upper portion of said oil pot, means for conducting air to said air chest, said annular oil pot and said annular air chest being adjacent to and spaced upwardly from the bottom of said outer drum, whereby the heated products of combustion will pass around and below both said annular air chest and said annular oil pot to thereby preheat both the air and the oil, a housing surrounding said outer drum and having cold air inlet and hot air outlet means and being spaced from the top and bottom of said outer drum, an annularly arranged series of air flues between said annular baffle and said outer drum, and a second series of air flues within said inner drum, all of said air flues opening through the top and bottom of said outer drum.

FRED E. WILSON.

REFERENCES CITED

The following references are of record in the file of this patent:

UNITED STATES PATENTS

| Number | Name | Date |
|---|---|---|
| 721,756 | Spiller | Mar. 3, 1903 |
| 2,227,773 | Warren | Jan. 7, 1941 |
| 2,320,821 | Jimenez | June 1, 1943 |
| 2,376,171 | Mueller | May 15, 1945 |
| 2,386,437 | Coleman | Oct. 9, 1945 |
| 2,392,757 | Miller | Jan. 8, 1946 |